UNITED STATES PATENT OFFICE 2,442,283

EMULSION COPOLYMERIZATION OF VINYLFURANE AND STYRENE

Walter Bock, Cologne, Germany, assignor, by mesne assignments, to General Aniline & Film Corporation, New York, N. Y., a corporation of Delaware No Drawing. Application July 21, 1939, Serial No. 285,662. In Germany December 4, 1936

6 Claims. (Cl. 260—86)

The present invention relates to a new polymerizate and to a process of preparing the same.

I have found that valuable new polymerization products are obtained by converting 2-vinylfurane, i. e. the product of the formula

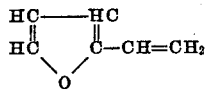

into an aqueous emulsion and effecting polymerization thereof while being in emulsion. The polymeric products thus obtained are only slightly colored and can be used as lacquer raw materials and also in the manufacture of moulded articles.

In the emulsion polymerization emulsifying agents and accelerators, as for instance, oxygen or oxygen-yielding compounds and/or controlling agents such as sulfur or sulfur yielding substances can be used in the usual manner. Among the emulsifiers usually employed in the emulsion polymerization I prefer alkali metal salts of higher fatty acids such as those of oleic acid, linoleic acid, stearic acid or of the mixture of higher fatty acids obtained by the oxidation of paraffines. Such soaps can be used either alone or in admixture with each other or with other emulsifying agents such as salts of alkylated naphthalene sulfonic acids. As the result of the emulsion polymerization the polymeric product is mostly obtained as an emulsion resembling natural latex in outer appearance. This emulsion can be worked up like latex or the solid product can be precipitated therefrom in the usual way, if desired, after the incorporation therewith of fillers, softening agents or other plastic materials.

A freshly prepared polyvinylfurane is thermoplastic within a range of temperature between about 70 and about 90° C. It is insoluble in ligroin and alcohols, soluble in aromatic and chlorinated hydrocarbons, esters and cyclic amines. Upon evaporation there are obtained from such solutions films of good stability to water and light, good elasticity and adhesive power. Owing to their thermoplasticity these products can be worked on hot rollers so that other plastic masses, softening agents or filling materials can be incorporated therewith. The outstanding property of the polymerizates prepared in accordance with my present invention is their capability of self-hardening if exposed to oxygen or to the air. In consequence thereof, films or coatings made from polyvinylfurane gradually become insoluble in most solvents so that they cannot be attacked even by strong paint removers such as methylene chloride. The capability of self-hardening of these products exhibits advantages also in case of moulded articles. The tendency of the material of becoming insoluble can be counteracted, if desired, by the incorporation therewith of suitable stabilizing agents such as amines or aromatic hydroxy compounds. Furthermore, for storing purposes the freshly prepared polymerizate can be dissolved in a solvent the stabilizer being added to the solution.

In accordance with another feature of my present invention the 2-vinylfurane is subjected to the emulsion polymerization in the presence of other polymerizable substances. Owing to the remarkably low tendency of being polymerized of the 2-vinylfurane I prefer to work with such polymerizable compounds as are easily polymerized in aqueous emulsion. Such polymerizable compounds are those containing an activated C=C double bond, i. e. unsaturated compounds the double bond of which is conjugated with another multiple bond. Such easily polymerizable compounds are, for instance, styrene, acrylic acid derivatives, butadiene-1,3 and its substitution products, and vinylalkylketones. Particular importance is attached to the products of the conjoint polymerization in aqueous emulsion of 2-vinylfurane and styrene, the latter being present in the mixed polymerizate in an amount not exceeding 50%, preferably in an amount of about 25–35%. The presence of styrene exerts an accelerating effect upon the course of the polymerization whereas its presence in the mixed polymerizate effects a decrease of the tendency of the product of becoming insoluble in organic solvents. Thus, products of the mixed polymerization of 2-vinylfurane and other polymerizable compounds, such as styrene, are still capable of being hardened by exposing the same to elevated temperatures but are free from the disadvantage of undergoing an undesirable self-hardening at ordinary temperatures.

I am aware of the U. S. Patent No. 1,911,722 to Sorenson which describes and claims the polymerization of furylethylene per se or dissolved in organic solvents to the action of heat or ultra-violet light. The patentee states that the polymerization has to be continued before the polymeric product becomes insoluble in toluol. As the result of my experiments I can say that I have been unable to prepare a practically suitable product when working according to the directions given in the said patent. Thus, the heating of furylethylene with benzoyl peroxide in a pressure tube at 180–190° C. results in a dark colored product which is not capable of yielding a solution in toluol, the mixture of the product in toluol representing a gelatinous mass. In consequence thereof, I have been unable to prepare films, coatings and the like from such a product. In case furylethylene is polymerized in the presence of toluol by heating this mixture with benzoyl peroxide in the pressure tube to 200–210° C. there is obtained a product which is partly soluble in toluol and partly insoluble therein. Films or coatings prepared from such soluble ingredients become brittle and assume a dark color after a few days' exposure to the air and are quickly attacked by water. Contrary thereto, the products obtainable in accordance with my present invention are easily soluble in organic solvents, at least in the freshly prepared state; they are light colored and are not darkened on exposure to the air. Finally the mechanical properties of the products are not materially changed by the subsequent hardening so that my products allow one to prepare films and coatings which combine an excellently mechanical property with an extremely good resistance towards organic solvents.

This application is a continuation-in-part application of my co-pending earlier application Ser. No. 176,624, filed Nov. 26, 1937, now abandoned.

The following examples illustrate the invention the parts being by weight:

Example 1

100 parts of 2-vinylfurane are stirred or shaken at room-temperature with 200 parts of a ten per cent sodium oleate solution with the addition of 0.3 part of potassium persulfate. After 2 days an emulsion is formed. After the incorporation therewith of 2 parts of phenyl-β-naphthylamine as stabilizer the polymerizate can be isolated by precipitation by means of alcohols, salts or acids, the yield being about 80%. The product is soluble in benzene, carbontetrachloride, ethyl acetate and pyridin.

Instead of sodium oleate other emulsifying agents such as stearates, linoleates or sodium dialkylnaphthalene-sulfonate can be used.

Example 2

100 parts of 2-vinylfurane are shaken at 40–45° C. with a solution of 6 parts of ω-diethylamino-4-ethoxyoleylanilide hydrochloride in 200 parts of water and 0.3 part of hydrogen peroxide. After 3 days a latex is formed from which the polyvinylfurane can be obtained by precipitation with alkalis.

Example 3

A mixture of 66 parts of styrene and 33 parts of 2-vinylfurane is shaken at 25° C. with 0.3 part of potassium persulfate and with 200 parts of a ten per cent sodium oleate solution. After one day a thick emulsion is obtained which can be worked up as described in the preceding examples, preferably after the addition of a small amount of the condensation product of a α-naphthylamine and aldol acting as stabilizer; the polymerizate is obtained in a yield of about 85%.

10 parts of the product completely freed from soap are dissolved in a mixture of 25 parts of ethyl acetate, 25 parts of toluene, 10 parts of butyl acetate and 15 parts of xylene to which 0.3 part of piperidine is added. From this solution there are obtained after evaporation of the solvent clear films which after having been exposed to a moderately elevated temperature are no longer soluble in the said mixture of solvents.

Example 4

75 parts of 2-vinylfurane and 37.5 parts of acrylic acid nitrile are shaken at room-temperature with 110 parts of a ten per cent sodium oleate solution with the addition of 0.3 part of potassium persulfate. After one day a solid pasty emulsion is formed; after having incorporated therewith 2 parts of 1-phenyl-amino-8-amino-naphthalene, dissolved in some benzene, the polymerizate is precipitated by means of methylalcohol. After filtration, extraction with methyl alcohol and drying a benzene soluble polymerizate with a nitrogen content of 6.4% is obtained in a yield of 70%. This product shows a rather low viscosity in dilute solutions. The films of the polymerizate thus obtained are hard and somewhat brittle and are rendered insoluble if exposed to a higher temperature.

Example 5

135 parts of butadiene-1.3 and 45 parts of 2-vinylfurane are shaken in emulsion with 350 parts of a ten per cent sodium oleate solution with the addition of 0.35 part of potassium persulfate for 2 days at about 25° C. and then for another 2 days at about 40–45° C. The emulsion thus formed is precipitated by means of acetic acid after having been stabilized by means of some phenyl-β-naphthylamine, the oleic acid being removed by extraction. A polymerizate in a yield of about 65% is obtained which with 50% gas black yields vulcanizates exhibiting a tensile strength of 230–250 kg./cm.$^2$, an elongation of 450–500% at a resiliency of 40–45%.

Example 6

75 parts of 2-vinylfurane and 25 parts of styrene are emulsified in 200 parts of a ten per cent aqueous sodium oleate solution and are polymerized with addition of 0.4 part of potassium persulfate and 0.65 part of dialkylxanthogendisulfide at 25–30° C. for 4 days. Into the resulting emulsion there are incorporated 1.5 parts of diethylamine, thereupon the whole is stirred in methylalcohol and the precipitated, well washed product is dried in a stream of nitrogen at 50° C. The mixed polymerizate obtained in a yield of 80–85% is soluble in aromatic hydrocarbons. The solutions yield clear films of good elasticity and stability.

Example 7

65 parts of 2-vinylfurane and 35 parts of styrene are emulsified with addition of 0.5 part of ammoniumpersulfate and a mixture having been produced from 141 parts of water, 2.05 parts of 19.6% soda lye, 5 parts of sodium diisobutyl-naphthalene-1-sulfonate, 2 parts of oleic acid and 0.83 part of sodiumpyrophosphate, and are polymerized at 50–55° C. for 4 days. A latex-like emulsion is obtained from which the mixed polymerizate can be obtained by salting out.

I claim:

1. The process as claimed in claim 5 wherein the styrene is present in an amount between about 25 and 35% of the total amount of polymerizable compounds.

2. A co-polymer of vinylfurane and styrene.

3. The process of producing copolymers which comprises subjecting styrene and vinyl furane to copolymerization in an aqueous emulsion in the presence of a polymerization accelerator comprising an oxygen-yielding substance.

4. The process of producing copolymers which comprises converting styrene and vinyl furane into an aqueous emulsion containing sodium oleate as the emulsifying agent, and subjecting the vinyl furane and styrene in said aqueous emulsion to copolymerization in the presence of an alkali metal per-compound as an accelerator.

5. The process of producing copolymers which comprises subjecting styrene and vinylfurane to copolymerization in an aqueous emulsion in the presence of a polymerization accelerator selected from the class consisting of oxygen and oxygen-yielding substances, the styrene being present in an amount not exceeding 50% of the total amount of polymerizable compounds.

6. A copolymer of vinylfurane and 25 to 35 per cent of styrene.

WALTER BOCK.

REFERENCES CITED

The following references are of record in the file of this patent:

UNITED STATES PATENTS

| Number | Name | Date |
| --- | --- | --- |
| 1,911,722 | Sorenson | May 30, 1933 |
| 1,937,063 | Meisenburg | Nov. 28, 1933 |
| 2,066,330 | Carothers et al. | Jan. 5, 1937 |
| 2,068,424 | Mark et al. | Jan. 19, 1937 |
| 2,125,649 | Reppe et al. | Aug. 2, 1938 |
| 2,160,943 | Britton et al. | June 6, 1939 |

OTHER REFERENCES

Chem. Abs. 1927, vol. 21, page 2896.